UNITED STATES PATENT OFFICE.

NIELS C. CHRISTENSEN, OF SALT LAKE CITY, UTAH.

PROCESS OF TREATING COPPER ORES.

1,357,952. Specification of Letters Patent. Patented Nov. 9, 1920.

No Drawing. Application filed September 30, 1919. Serial No. 327,404.

*To all whom it may concern:*

Be it known that I, NIELS C. CHRISTENSEN, a citizen of the United States, residing at Salt Lake City, in the county of Salt Lake and State of Utah, have invented certain new and useful Improvements in Processes of Treating Copper Ores, of which the following is a specification.

This invention relates to processes for the lixiviation of oxidized ores of copper (or sulfid ores which have been roasted) with an $SO_2$ solution or to lixiviation processes in which $SO_2$ is used in precipitating copper solutions and more especially to the recovery of the copper from these solutions. The invention relates particularly to the precipitation of the copper from the copper sulfite solution or from $SO_2$ solutions containing copper sulfate.

The lixiviation of the ore to secure the copper in solution as a copper sulfite is described in my U. S. Patent applications No. 118,156, No. 226,523, No. 287,519, so that it is not necessary to describe this part of the process in detail, except to repeat here that the ore should be lixiviated with a cold concentrated $SO_2$ solution free from soluble sulfates, and that this operation should preferably be carried out by agitating the ore with the $SO_2$ solution. After the copper has been dissolved the pregnant solution should be separated from the lixiviated ore and the precipitation carried out without bringing the solution into contact with air. Precaution should be taken to prevent the introduction of $SO_3$ and sulfates into the solution or the oxidation of the sulfites in solution to sulfates if complete precipitation is to be secured and loss of $SO_2$ avoided.

The object of my invention is to precipitate the copper from the $SO_2$ solution as a cupro-cupric sulfite without the formation of copper sulfate and without heating the solution or driving off the excess $SO_2$.

As described in my U. S. patent application No. 226,523 I can accomplish the precipitation of the copper as cupro-cupric sulfite by adding copper to the copper sulfite solution and heating the solution and driving off the excess $SO_2$. When the precipitation is brought about in this manner other sulfites such as $CaSO_3$ which may be in solution are also precipitated with the copper. The heating of the solution to drive off the $SO_2$ and the absorption of the $SO_2$ to form a concentrated $SO_2$ solution to lixiviate more ore are also steps which it is desirable to avoid, both because of saving in operating expense and in equipment.

As described in my U. S. patent application No. 287,517, the copper may be precipitated from the sulfite solution without heating by the addition of $Cu_2O$ but by this method all the $SO_2$ is also removed and the impurities such as $CaSO_3$, etc., are precipitated with the copper.

It is the object of this invention to secure the precipitation of the copper from the cold $SO_2$ solution without removing the excess $SO_2$ from the solution and without precipitating the impurities such as $CaSO_3$ with the cupro-cupric sulfite. I bring about this result by adding finely divided metallic copper to the cold $SO_2$ solution containing the copper in solution and agitating the solution so as to keep the copper in suspension and bring all the solution into contact with the copper. The copper in solution is precipitated as cupro-cupric sulfite by the action of the metallic copper as shown below:

$$2CuSO_3 + Cu = Cu_2SO_3 \cdot CuSO_3.$$

If any copper is present as sulfate in the $SO_2$ solution it may be precipitated as a cupro-cupric sulfite by adding lime, calcium carbonate, or calcium sulfite to the $SO_2$ solution and then adding the metallic copper. The lime or lime-stone dissolves in the $SO_2$ solution to form calcium bisulfite which reacts with the $CuSO_4$ to give $CaSO_4$ and $CuSO_3$ in solution and the $CuSO_3$ is then precipitated as cupro-cupric sulfite.

The reactions are indicated below:

$$CaCO_3 + 2H_2SO_3 = Ca(HSO_3)_2 + H_2O + CO_2$$
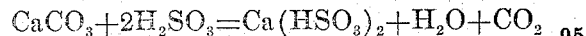
$$CuSO_4 + Ca(HSO_3)_2 = CuSO_3 + CaSO_4 + H_2SO_3$$
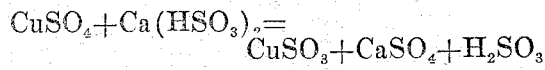
$$2CuSO_3 + Cu = Cu_2SO_3 \cdot Cu_2SO_3$$
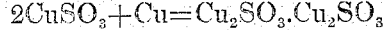

(The cupro-cupric sulfite contains two molecules of combined water but these are neglected in the equations.)

If it is desired to precipitate the copper from a copper sulfate solution as cuprocupric sulfite this may be done by saturating the solution with $SO_2$, adding enough lime, lime-stone, or calcium sulfite to change all the copper to copper sulfite, and adding the finely divided metallic copper. The reactions are as noted above.

In all cases an excess of copper over the theoretical amount must be used as the action coats the copper particles and prevents the inside of the particles coming in contact with the copper solution. The finer the copper the smaller the amount required and the quicker the action.

The finely divided copper for the precipitation is secured by roasting the cupro-cupric sulfite precipitate without access of air and in the presence of the excess of metallic copper from the precipitating operation, and reducing the cuprous oxid thus formed to metallic copper by a suitable reducing agent, as indicated below:

$$Cu_2SO_3 \cdot CuSO_3 + Cu = 2Cu_2O + 2SO_2$$

$$Cu_2O + C = 2Cu + CO$$

$$Cu_2O + H_2 = 2Cu + H_2O$$

This gives the copper in the very finely divided form which is best suited to the process.

The roasting and reducing operations are very simple and require but a short time and relatively low temperature on account of the fine subdivision of the precipitate.

The precipitation of the copper from the cold $SO_2$ solution without removing the $SO_2$ and without precipitation of the impurities along with the cupro-cupric sulfite constitute an improvement of considerable importance in the treatment of copper ore with an $SO_2$ solution, and makes possible the advantageous application of the process to ores containing considerable calcium carbonate and other soluble compounds.

Having described my process what I claim and desire to patent is:

1. The process of precipitating copper from an $SO_2$ solution which consists in mixing metallic copper with said solution and thereby precipitating the copper as a cupro-cupric sulfite.

2. The process of precipitating copper from an $SO_2$ solution which consists in mixing finely divided metallic copper with said solution and thereby precipitating the copper as a cupro-cupric sulfite.

3. The process of precipitating the copper present as a sulfate in an $SO_2$ solution which consists in adding to said solution a lime compound which will form a soluble sulfite in said solution and adding metallic copper to said solution and thereby precipitating the copper as a cupro-cupric sulfite.

4. The process of precipitating the copper present as a sulfate in an $SO_2$ solution which consists in adding to said solution a lime compound which will form a soluble sulfite in said solution, and adding finely divided metallic copper to said solution, thereby precipitating the copper as a cupro-cupric sulfite.

5. The process of precipitating the copper from a copper sulfate solution which consists in adding $SO_2$ to said solution, adding to said solution a lime compound which will form a soluble sulfite in said solution, and adding metallic copper to said solution and thereby precipitating the copper as a cupro-cupric sulfite.

6. The process of precipitating the copper from a copper sulfate solution which consists in adding $SO_2$ to said solution, adding to said solution a lime compound which will form a soluble sulfite in said solution, and mixing finely divided metallic copper with said solution and thereby precipitating the copper as a cupro-cupric sulfite.

In testimony whereof I have signed my name to this specification.

NIELS C. CHRISTENSEN.